(12) United States Patent
Takahashi et al.

(10) Patent No.: US 9,762,820 B2
(45) Date of Patent: Sep. 12, 2017

(54) IMAGING DEVICE AND FOCAL PLANE SHUTTER

(71) Applicant: SEIKO PRECISION INC., Narashino-shi (JP)

(72) Inventors: Hiroshi Takahashi, Narashino (JP); Chiaki Nemoto, Narashino (JP); Yoichi Nakano, Narashino (JP)

(73) Assignee: SEIKO PRECISION INC., Narashino-shi (JP)

( * ) Notice: Subject to any disclaimer, the term of this patent is extended or adjusted under 35 U.S.C. 154(b) by 0 days.

(21) Appl. No.: 14/817,424

(22) Filed: Aug. 4, 2015

(65) Prior Publication Data

US 2015/0341574 A1  Nov. 26, 2015

Related U.S. Application Data

(63) Continuation of application No. PCT/JP2014/051285, filed on Jan. 22, 2014.

(30) Foreign Application Priority Data

Mar. 27, 2013  (JP) .................................. 2013-067350

(51) Int. Cl.
*H04N 5/335* (2011.01)
*H04N 5/235* (2006.01)
(Continued)

(52) U.S. Cl.
CPC .............. *H04N 5/335* (2013.01); *G03B 9/36* (2013.01); *H04N 5/238* (2013.01); *H04N 5/2353* (2013.01); *H04N 5/3765* (2013.01)

(58) Field of Classification Search
CPC ...... H04N 5/335; H04N 5/2353; H04N 5/238; H04N 5/3765; G03B 9/36
See application file for complete search history.

(56) References Cited

U.S. PATENT DOCUMENTS 6,795,122 B2 * 9/2004 Takahashi ............ H04N 5/2254
348/362
2002/0064388 A1  5/2002 Takahashi
(Continued)

FOREIGN PATENT DOCUMENTS

CN   102597866 A   7/2012
CN   102667609 A   9/2012
(Continued)

OTHER PUBLICATIONS

International Search Report for International Application No. PCT/JP2014/051285 dated Mar. 4, 2014.
(Continued)

Primary Examiner — Nhan T Tran
(74) Attorney, Agent, or Firm — Kratz, Quintos & Hanson, LLP

(57) ABSTRACT

An imaging device includes: an image pickup element; a focal plane shutter including: a board including an opening exposing the image pickup element; a leading shutter and a trailing shutter movable between a closed position to close the opening and an opened position to open the opening; and a leading shutter actuator and a trailing shutter actuator respectively driving the leading shutter and the trailing shutter, a drive control portion that drives the leading shutter actuator and the trailing shutter actuator; and a control portion that controls the image pickup element.

6 Claims, 10 Drawing Sheets

(51) Int. Cl.
*G03B 9/36* (2006.01)
*H04N 5/238* (2006.01)
*H04N 5/376* (2011.01)

(56) References Cited

U.S. PATENT DOCUMENTS

| | | | |
|---|---|---|---|
| 2004/0101299 A1* | 5/2004 | Matsumoto | G03B 9/08 396/452 |
| 2012/0134660 A1* | 5/2012 | Nakano | G03B 9/36 396/468 |
| 2012/0177359 A1 | 7/2012 | Takahashi et al. | |
| 2012/0213505 A1 | 8/2012 | Takahashi et al. | |
| 2012/0249849 A1* | 10/2012 | Nakano | H04N 5/3532 348/296 |
| 2012/0328280 A1* | 12/2012 | Nakano | G03B 9/42 396/489 |
| 2014/0010526 A1* | 1/2014 | Takahashi | G03B 9/10 396/469 |
| 2014/0160312 A1 | 6/2014 | Shintani | |
| 2014/0168457 A1* | 6/2014 | Shintani | H04N 5/23245 348/220.1 |
| 2014/0176747 A1 | 6/2014 | Shintani | |
| 2014/0247387 A1* | 9/2014 | Nakano | H04N 5/2353 348/367 |
| 2014/0248046 A1* | 9/2014 | Takahashi | G03B 9/36 396/456 |
| 2014/0320737 A1* | 10/2014 | Takahashi | G03B 9/36 348/367 |
| 2014/0347534 A1* | 11/2014 | Nakano | G03B 9/36 348/296 |
| 2015/0227020 A1* | 8/2015 | Takahashi | G03B 9/42 348/362 |
| 2015/0268533 A1* | 9/2015 | Oishii | G03B 9/36 396/471 |
| 2015/0309387 A1* | 10/2015 | Nemoto | G03B 9/36 348/294 |

FOREIGN PATENT DOCUMENTS

| | | | | |
|---|---|---|---|---|
| CN | 102822737 A | | 12/2012 | |
| JP | 10206925 A | * | 8/1998 | ............... G03B 9/36 |
| JP | H10-206925 | | 8/1998 | |
| JP | 2001-222059 A1 | | 8/2001 | |
| JP | 2002-162668 A1 | | 6/2002 | |
| JP | 2007-155774 A1 | | 6/2007 | |
| JP | 2011-164331 A1 | | 8/2011 | |
| JP | 2011164331 A | * | 8/2011 | ............... G03B 9/36 |
| WO | WO 2013/027422 A1 | | 2/2013 | |

OTHER PUBLICATIONS

JP 2013-067350: Notification of Reasons for Refusal, dated Oct. 4, 2016.
Chinese Patent Application No. 201480018841.3: First Notification of Office Action dated Jul. 3, 2017.

* cited by examiner

IMAGING DEVICE AND FOCAL PLANE SHUTTER

CROSS-REFERENCE TO RELATED APPLICATION

This application is a continuation of and claims priority to International Patent Application No. PCT/JP2014/051285 filed on Jan. 22, 2014, which claims priority to Japanese Patent Application No. 2013-067350 filed on Mar. 27, 2013, subject matter of these patent documents is incorporated by reference herein in its entirety.

BACKGROUND (i) Technical Field

The present invention relates to imaging devices and focal plane shutters.

(ii) Related Art

There is known a focal plane shutter. The focal plane shutter includes: a leading shutter and a trailing shutter opening and closing an opening of a board; and a set member positioning the leading shutter and the trailing shutter at start positions. Japanese Unexamined Patent Application Publication No. 2001-222059 discloses such a focal plane shutter.

In a case of a normally open type of a focal plane shutter, the opening is maintained in a fully opened state before and after an exposure operation starts, enabling live view display to display outputs from an image pickup element on a liquid crystal monitor of a camera in a real-time manner.

In continuous shooting, such a focal plane shutter operates as follows. The set member positions the leading shutter at a position to close the opening from the fully opened state. After that, the leading shutter and the trailing shutter move to perform an exposure operation. After the exposure operation finishes, the rotation of the set member in one direction moves the trailing shutter away from the opening, so the opening is brought into a fully opened state. After that, the further rotation of the set member in the same direction positions the leading shutter at a position to close the opening. After that, the exposure operation is performed again. In this way, in the normally open type of the focal plane shutter, the fully opened state is formed between the exposure operations even in the continuous shooting. It is therefore difficult to reduce an imaging interval in the continuous shooting.

SUMMARY

According to an aspect of the present invention, there is provided an imaging device including: an image pickup element; a focal plane shutter including: a board including an opening exposing the image pickup element; a leading shutter and a trailing shutter movable between a closed position to close the opening and an opened position to open the opening; and a leading shutter actuator and a trailing shutter actuator respectively driving the leading shutter and the trailing shutter, a drive control portion that drives the leading shutter actuator and the trailing shutter actuator; and a control portion that controls the image pickup element, wherein the leading shutter and the trailing shutter are positioned in the opened position, both when shooting starts and when the shooting finishes, the leading shutter moves from the closed position to the opened position and the trailing shutter moves from the opened position to the closed position to perform an exposure operation, during continuous shooting, after a first exposure operation finishes, a charging operation is performed such that the leading shutter moves from the opened position to the closed position and the trailing shutter moves from the closed position to the opened position while the opening is maintained in a closed state by cooperation of the leading shutter and the trailing shutter, after the charging operation finishes, a second exposure operation is performed.

DETAILED DESCRIPTION

Figure 1:
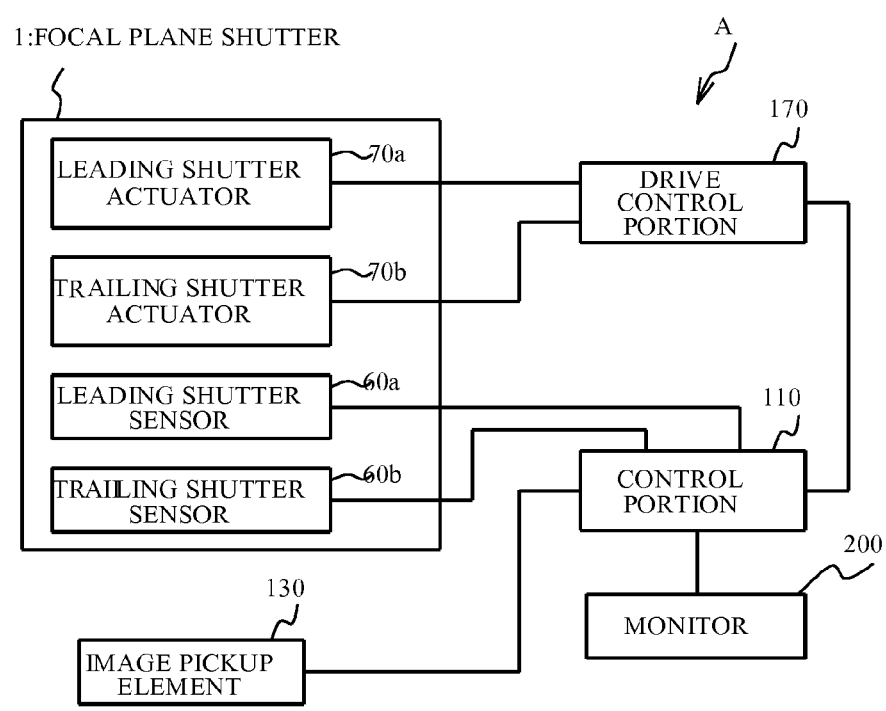
FIG. 1 is a block diagram of a camera including a focal plane shutter.

FIG. 1 is a block diagram of a camera (imaging device) A including a focal plane shutter 1. The camera A includes the focal plane shutter 1, a control portion 110, an image pickup element 130, and a drive control portion 170. The focal plane shutter 1 includes a leading shutter actuator (hereinafter, referred to as actuator) 70a, a trailing shutter actuator (hereinafter, referred to as actuator) 70b, a leading shutter sensor (hereinafter, referred to as sensor) 60a, and a trailing shutter sensor (hereinafter, referred to as sensor) 60b, as will be described later in detail. The drive control portion 170 controls the drive of the actuators 70a and 70b in accordance with the instruction from the control portion 110. The drive control portion 170 includes a CPU. The control portion 110 instructs the drive control portion 170 in accordance with the signals from the sensors 60a and 60b, as will be described later in detail. In response to this instruction, the drive control portion 170 controls the drive of the actuators 70a and 70b. The control portion 110 controls the operation of the whole camera, and includes the CPU, a ROM, and a RAM. The image pickup element 130 is a CMOS. The image pickup element 130 is a light receiving element that converts subject images into electric signals on the basis of photoelectric conversion. A monitor 200 displays an image taken by the image pickup element 130 or moving image data from the image pickup element 130. The monitor 200 is an example of a display portion. Moreover, the camera A includes lenses, not illustrated in FIG. 1, for adjusting a focal length.

Figure 2:
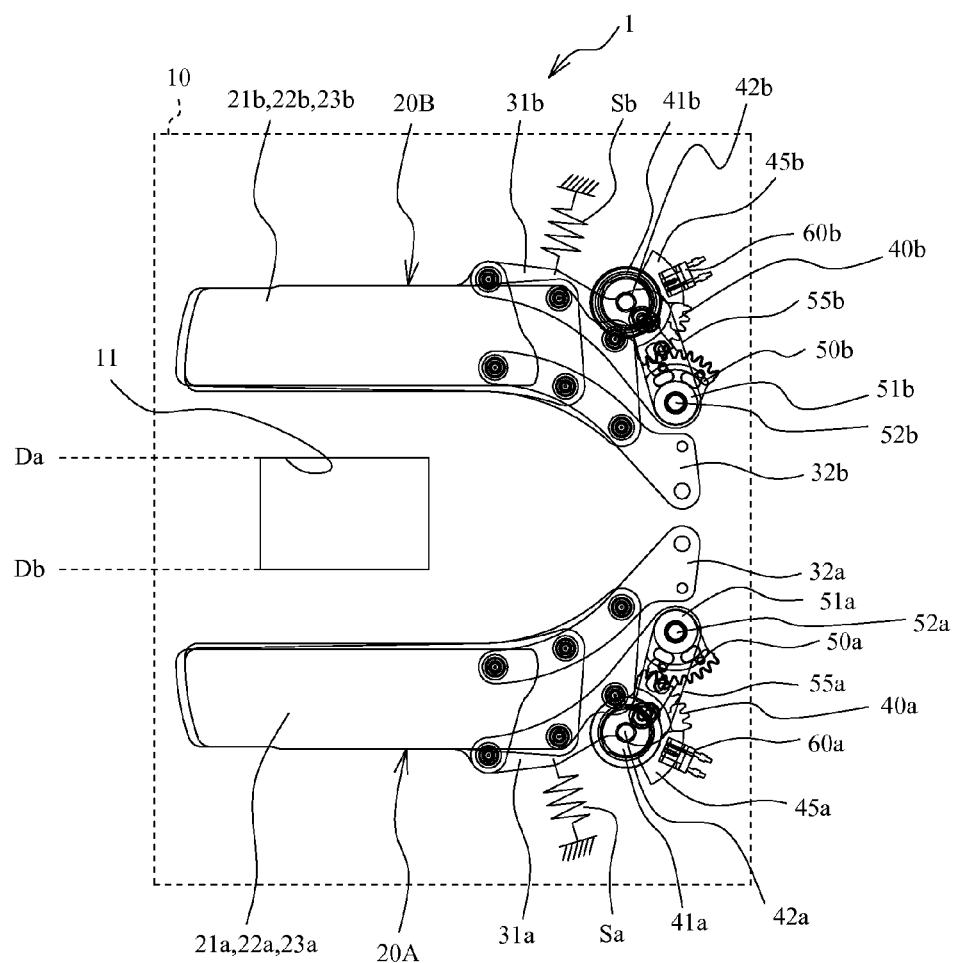
FIG. 2 is a front view of the focal plane shutter.

FIG. 2 is a front view of the focal plane shutter 1. In FIG. 2, the actuators 70a and 70b are omitted. The focal plane shutter 1 includes a board 10, a leading shutter 20A, a trailing shutter 20B, arms 31a, 32a, 31b, and 32b, and the actuators 70a and 70b. The board 10 is provided with a rectangular opening 11. FIG. 2 illustrates an imaging surface of the image pickup element 130 within the opening 11. The leading shutter 20A and the trailing shutter 20B are examples of respective first and second shutters. Additionally, the actuators 70a and 70b are examples of respective first and second actuators.

The leading shutter 20A includes three blades 21a to 23a. The trailing shutter 20B includes three blades 21b to 23b. FIG. 2 illustrates the leading shutter 20A and the trailing shutter 20B in overlapped states. In FIG. 2, the leading shutter 20A and the trailing shutter 20B recedes from the opening 11. The leading shutter 20A is connected to the arms 31a and 32a. The trailing shutter 20B is connected to the arms 31b and 32b. These arms 31a, 32a, 31b, 32b are rotatably supported by the board 10.

The board 10 is provided with a leading shutter drive lever 55a (hereinafter, referred to as drive lever) and a trailing shutter drive lever 55b (hereinafter, referred to as drive lever) for driving the arms 31a and 31b, respectively. The drive levers 55a and 55b are connected with gears 50a and 50b, respectively. The gears 50a and 50b engage gears 40a and 40b, respectively. The gears 40a, 40b, 50a, and 50b include pipe portions 41a, 41b, 51a, and 51b respectively, and are rotatably supported around spindles 42a, 42b, 52a, and 52b fitting into the pipe portions by the board 10, respectively. Additionally, the spindles 42a, 42b, 52a, and 52b do not have to be always formed on the board 10 in which the opening 11 is formed, and have only to be positionally fixed with respect to the opening 11. The gears 40a and 40b are connected with rotors of the actuators 70a and 70b, respectively. The driving of the actuator 70a drives the gears 40a and 50a, thereby driving the drive lever 55a. The driving of the drive lever 55a drives the arm 31a. Thus, the leading shutter 20A moves. The leading shutter 20A is movable between an opened positon to recede from the opening 11 and to open the opening 11 and a closed position to close the opening 11. The leading shutter 20A is moved between the opened position and the closed position by the actuator 70a. The gears 40b and 50b, the drive lever 55b, and the trailing shutter 20B each have the similar configuration.

The gears 40a and 40b are provided with thin plates 45a and 45b, respectively. The thin plates 45a and 45b rotate together with the gears 40a and 40b, respectively. The thin plates 45a and 45b each have a fan shape. Sensors 60a and 60b, will be described in detail, are provided on the board 10. The sensors 60a and 60b are examples of respective first and second detection portions.

Also, the arms 31a and 31b are connected with respective springs Sa and Sb. Specifically, one end of the spring Sa is connected with the arm 31a, and the other end is connected with the board 10. One end of the spring Sb is connected with the arm 31b, and the other end is connected with the board 10. The springs Sa and Sb bias the arms 31a and 31b to move the leading shutter 20A and the trailing shutter 20B away from the opening 11, respectively. The springs Sa and Sb are examples of respective first and second biasing members.

Figure 3A:
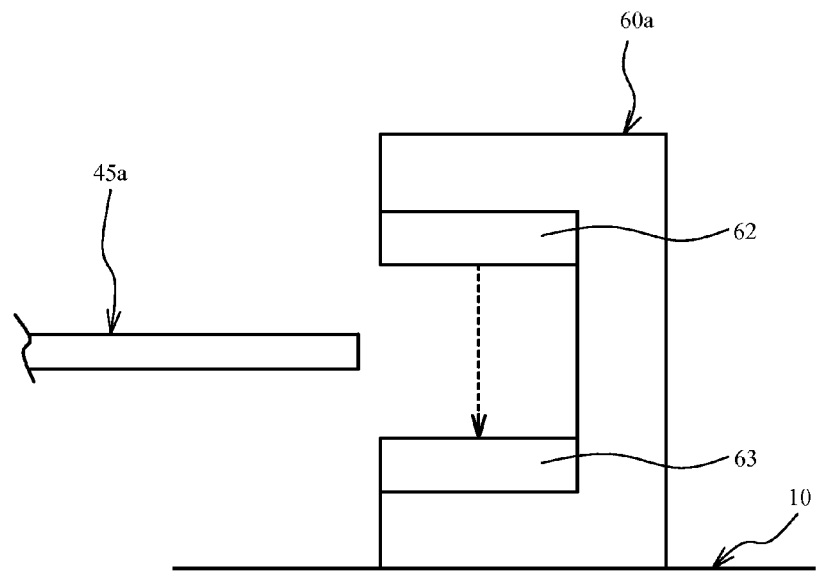
FIGS. 3A and 3B are explanatory views of a sensor.
Figure 3B:
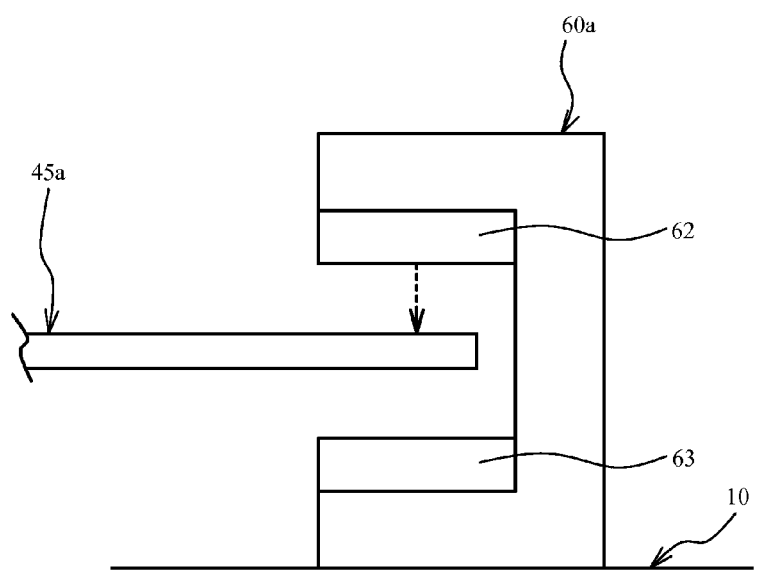

FIGS. 3A and 3B are explanatory views of the sensor 60a. The sensor 60a is arranged on the board 10. The sensor 60a has a light emitting element 62 and a light receiving element 63 that are arranged to face each other. The light receiving element 63 receives the light emitted from the light emitting element 62. As illustrated in FIGS. 3A and 3B, the rotation of the drive lever 55a moves the thin plate 45a between the light emitting element 62 and the light receiving element 63. When the thin plate 45a is located between the light emitting element 62 and the light receiving element 63, the light emitted from the light emitting element 62 is shaded. At this time, whether or not the thin plate 45a is positioned between the light emitting element 62 and the light receiving element 63 can be detected based on output signals from the light receiving element 63, thereby detecting the position of the drive lever 55a. This can result in detecting the position of the leading shutter 20A. Additionally, the sensor 60b and the thin plate 45b have the similar configurations.

Additionally, the sensor 60a is not limited to the above configuration. For example, the sensor 60a may include: a light emitting element; a mirror reflecting the light emitted from the light emitting element; and a light receiving element receiving the light reflected by the mirror. The thin plate 45a is positioned between the light emitting element and the mirror, or between the light receiving element and the mirror, thereby detecting the position of the thin plate 45a.

Figure 4:
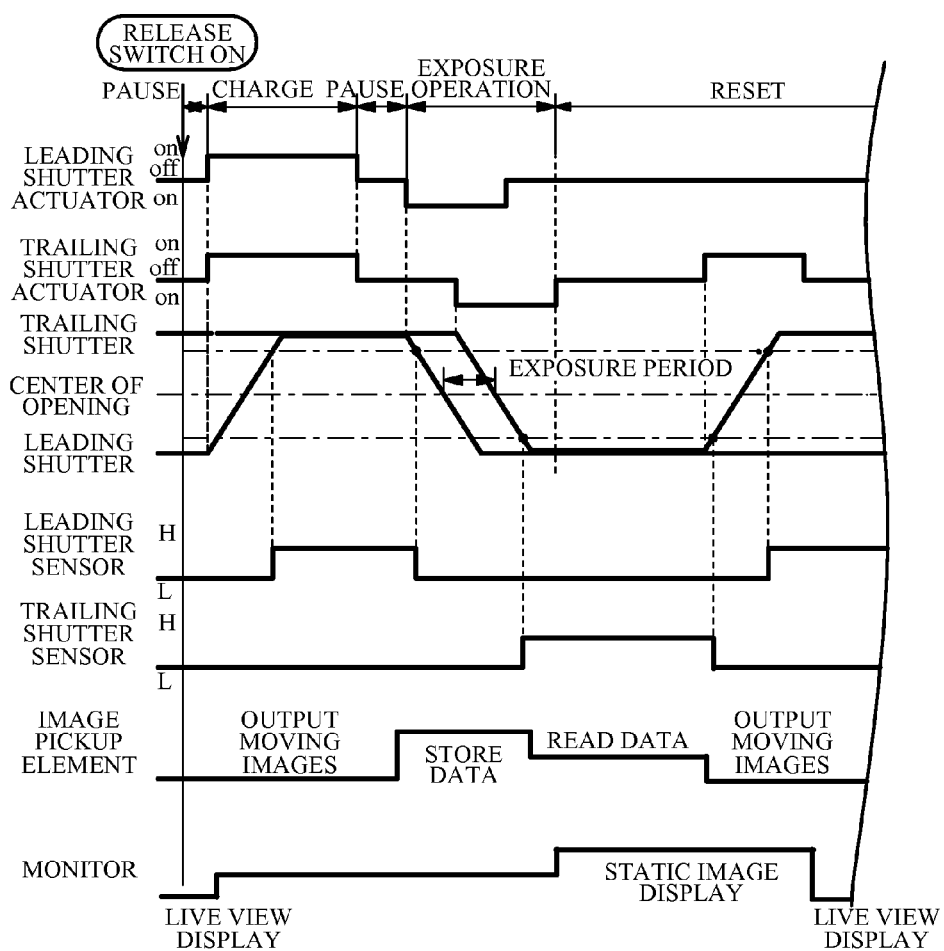
FIG. 4 is a timing chart of the focal plane shutter in a single shooting mode.

Next, a single shooting mode of the focal plane shutter 1 will be described. FIG. 4 is a timing chart of the focal plane shutter 1 in the single shooting mode. FIGS. 5 to 8 are explanatory views of the operation of the focal plane shutter 1. Additionally, some parts are omitted in FIGS. 5 to 8. In addition, the camera A according to the present embodiment can switch between the single shooting mode for shooting a single image and a continuous shooting mode for continuously shooting images for a predetermined period in accordance with an operation of a release switch. FIG. 4 is the timing chart in the single shooting mode.

In a wait state, as illustrated in FIG. 2, the leading shutter 20A and the trailing shutter 20B are positioned at the opened positions, and the opening 11 is maintained in the fully opened state. In this state, the thin plate 45a is positioned between the light emitting element 62 and the light receiving element 63 of the sensor 60a. Likewise, the thin plate 45b is positioned between the light emitting element and the light receiving element of the sensor 60b. Additionally, output signals of the sensor 60a illustrated in FIG. 4 are specifically output signals of the light receiving element 63. When the light from the light emitting element 62 is blocked by the thin plate 45a, the light receiving element 63 outputs an L signal to the control portion 110. When receiving the light from the light emitting element 62, the light receiving element 63 outputs an H signal to the control portion 110. The sensor 60b has a similar arrangement. Additionally, in the wait state illustrated in FIG. 2, the leading shutter 20A and the trailing shutter 20B are maintained at the positions receding from the opening 11 by the springs Sa and Sb, respectively.

Herein, the output signals from the sensors 60a and 60b output the L signal to the control portion 110, and the sensors 60a and 60b function as a sensor for detecting the fully opened state of the opening 11. This function adapts the camera A to a live view mode to display a moving image output from the image pickup element on a liquid crystal monitor or the like in real time. That is, in the focal plane shutter 1, the opening 11 is maintained in the fully opened state when the shooting starts and finishes, and moving images are displayed on the monitor 200 (hereinafter, referred to as live view display).

When the release switch of the camera A is pushed, a charging operation starts. When the charging operation starts, a coil of the actuator 70a is energized such that the leading shutter 20A moves and closes the opening 11. Specifically, the gear 40a rotates counterclockwise, and then the gear 50a rotates clockwise, which causes the arm 31a to drive. Also, the coil of the actuator 70b is energized such that the trailing shutter 20B moves away from the opening 11, and then this state is maintained.

Figure 5:
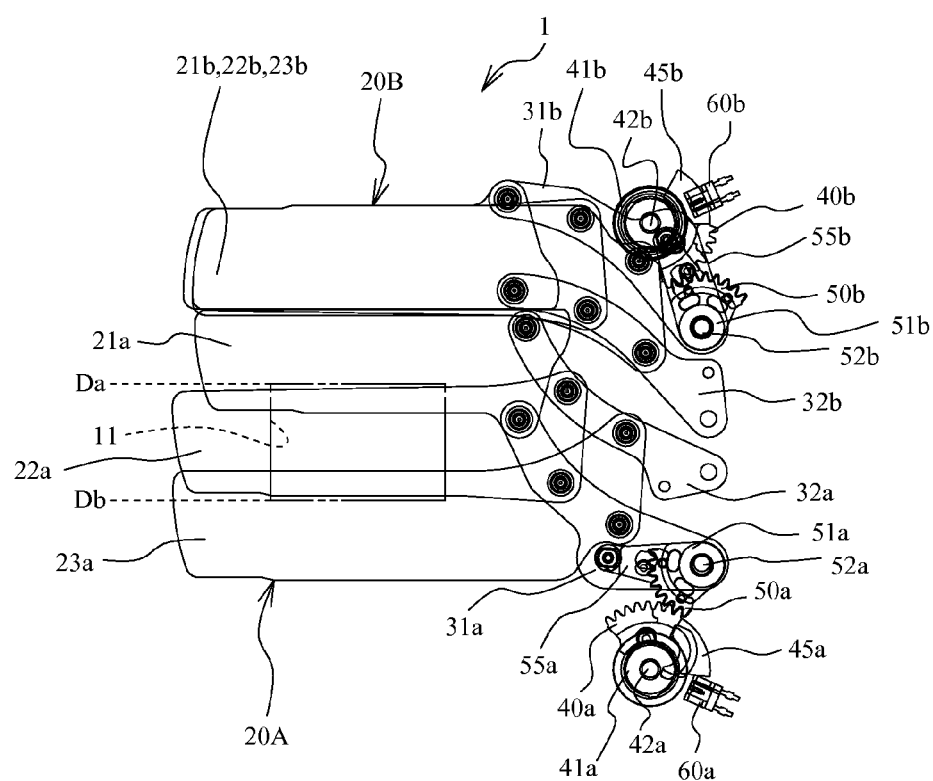
FIG. 5 is an explanatory view of an operation of the focal plane shutter.

After that, the coils of the actuators 70a and 70b stop being energized in the state where the leading shutter 20A closes the opening 11 and the trailing shutter 20B recedes from the opening 11. In such a way, the charging operation finishes. FIG. 5 illustrates the focal plane shutter 1 in the state where the charging operation finishes. In FIG. 5, the leading shutter 20A is positioned at the closed position, and the trailing shutter 20B is positioned at the opened position. Additionally, as illustrated in FIG. 5, the thin plate 45a moves away from the sensor 60a in the process that the leading shutter 20A is closing the opening 11. Therefore, the output signal from the sensor 60a is changed from the L signal into the H signal.

Figure 6:
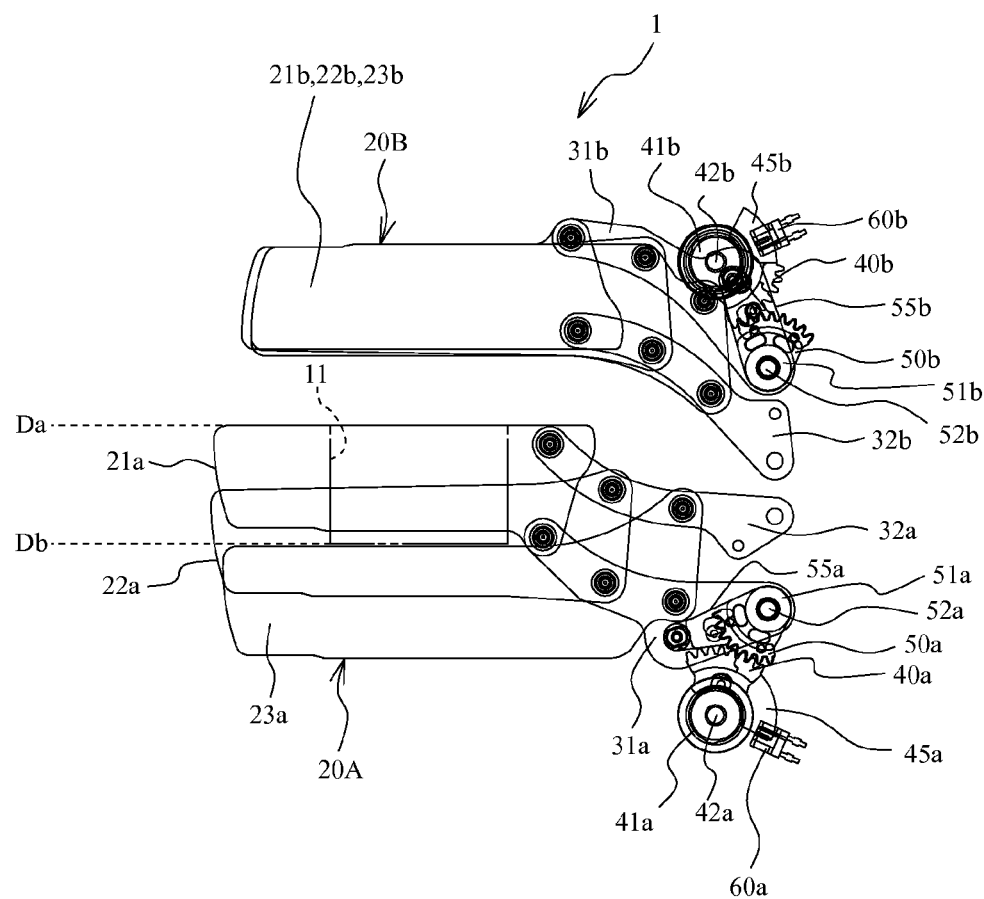
FIG. 6 is an explanatory view of the operation of the focal plane shutter.

After a predetermined period elapses from the time when the charging operation finishes, an exposure operation starts. The control portion 110 instructs the drive control portion 170 to energize the coil of the actuator 70a such that the leading shutter 20A moves and opens the opening 11. Specifically, the gear 40a drives clockwise, and the gear 50a drives counterclockwise. The leading shutter 20A moves in the same direction as the biasing direction of the spring Sa. In the process that the leading shutter 20A moves away from the opening 11, the thin plate 45a moves to the sensor 60a. FIG. 6 illustrates a state where the thin plate 45a moves to the sensor 60a and the time when the output signal from the sensor 60a is changed from the H signal into the L signal. The timing when the output signal from the sensor 60a is changed is set to be the timing when the blade 21a of the leading shutter 20A moves away from the point Da. In other words, this is the timing when the movement of the leading shutter 20A away from the opening 11 permits the exposure of the image pickup element 130 to start. The point Da is the point where the blade 21a starts moving away from the opening 11. The point Da is an example of a first position. In this way, when the leading shutter 20A is in the closed position and the trailing shutter 20B is in the opened position, the sensor 60a generates the output signals for detecting that the leading shutter 20A moves away from the opening 11 and passes through the first position. The control portion 110 detects the change in the output signal from the sensor 60a, thereby detecting that the leading shutter 20A passes through the point Da. Additionally, the timing when the output signal from the sensor 60a is changed is not limited to this timing.

Figure 7:
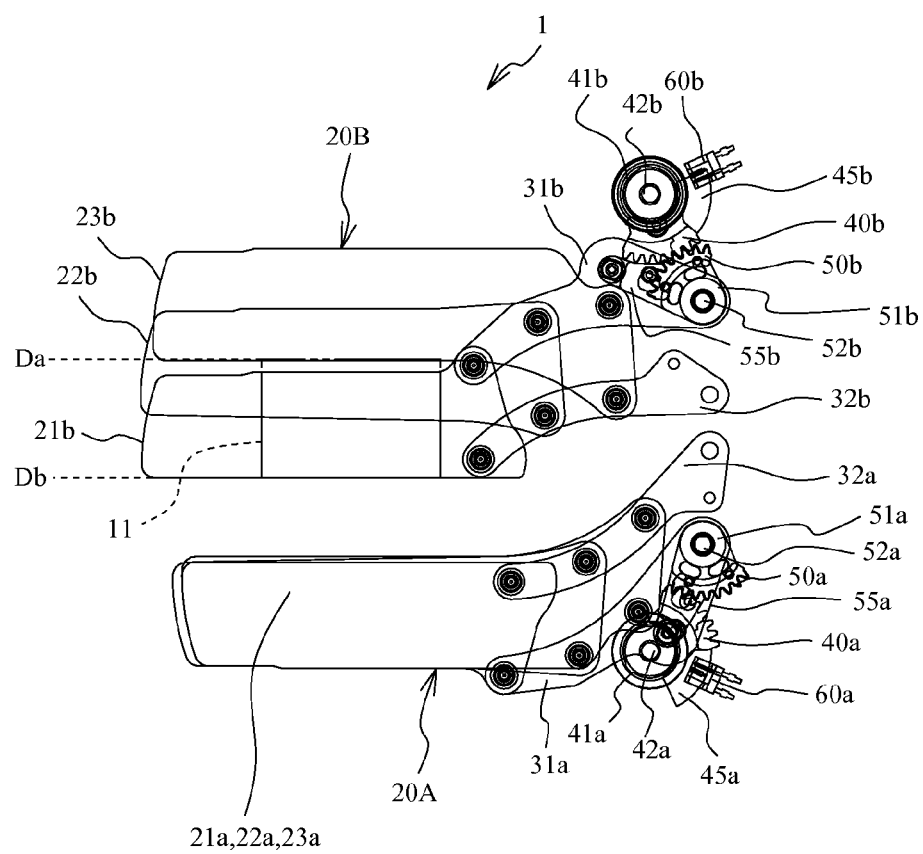
FIG. 7 is an explanatory view of the operation of the focal plane shutter.
Figure 8:
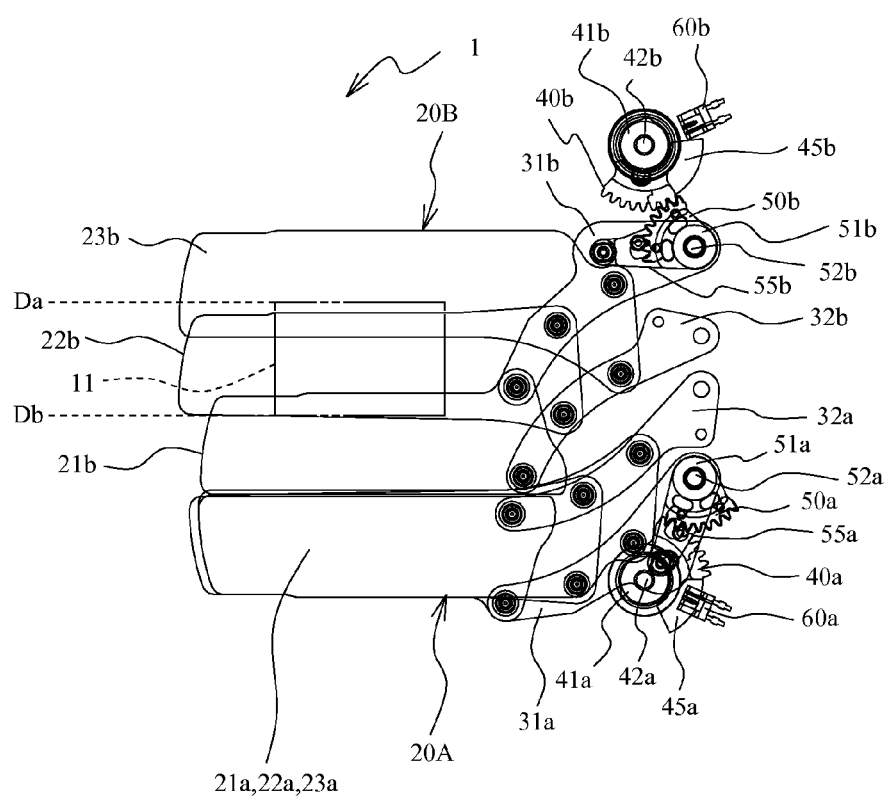
FIG. 8 is an explanatory view of the operation of the focal plane shutter.

After a predetermined period elapses from the time when the control portion 110 detects that the output signal from the sensor 60a is changed from the H signal into the L signal, the control portion 110 energizes the coil of the actuator 70b to start moving the trailing shutter 20B. The trailing shutter 20B moves in the direction opposite to the biasing direction of the spring Sb. Thus, the trailing shutter 20B moves to close the opening 11. FIG. 7 illustrates the state where the trailing shutter 20B is moving as will be described later in detail. When the leading shutter 20A fully recedes from the opening 11 and the trailing shutter 20B fully closes the opening 11, the actuators 70a and 70b stop being energized. FIG. 8 illustrates the state where the leading shutter 20A is in the opened position and the trailing shutter 20B is in the closed position. The exposure operation finishes in this way. A period from the time when the leading shutter 20A starts moving to open the opening 11 to the time when the trailing shutter 20B fully closes the opening 11 is referred to as an exposure period. In the exposure operation, the image pickup element 130 stores data of electrical signals converted from the object light.

After the exposure operation finishes, a RAM of the control portion 110 or a memory of the camera side reads the data. Next, the coil of the actuator 70b is energized so that the trailing shutter 20B moves away from the opening 11 to maintain the opening 11 in the fully opened state, whereby the state returns to an initial state illustrated in FIG. 2. In addition, after a static image taken by the exposure operation is displayed on the monitor 200 for a predetermined period, the monitor 200 performs the live view display.

As described above, the control portion 110 starts energizing the coil of the actuator 70b to start moving the trailing shutter 20B, after a predetermined period elapses from the time when it is detected that the moving leading shutter 20A passes through a predetermined position.

For example, when the trailing shutter 20B starts moving after a predetermined period elapses from the time when the leading shutter 20A starts moving, the movement characteristics of the leading shutter 20A might be varied depending on molding accuracy or assembling accuracy of parts. The variations in the movement characteristics of the leading shutter 20A might cause variations in the exposure period. This is because the trailing shutter 20B starts moving after a predetermined constant period elapses from the time when the leading shutter 20A starts moving. Further, in the exposure operation, the leading shutter 20A moves in the same direction as the biasing direction of the Sa, whereas the trailing shutter 20B moves in the direction opposite to the biasing direction of the Sb. For this reason, there is a difference in the load between the actuators 70a and 70b, and the continued use of the focal plane shutter 1 might increase a difference in the temperature between the actuators 70a and 70b. Thus, a resistance valve of the coil is smaller than that of the other coil, changing the amount of current through the coil, which might increase a difference in the rotational speed between actuators 70a and 70b. Such a factor might increase a difference in the movement characteristic between the leading shutter 20A and the trailing shutter 20B.

In the present embodiment, it is detected that the leading shutter 20A actually passes through a predetermined position on the basis of the change in the output from the sensor 60a, and the trailing shutter 20B starts moving after a predetermined period elapses from the time when it is detected that the leading shutter 20A actually passes through a predetermined position. For this reason, even when the movement characteristics of the leading shutter 20A are varied, the timing when the trailing shutter 20B starts moving is set in accordance with the movement characteristics of the leading shutter 20A. This suppresses the variations in the exposure period.

Additionally, the point through which the leading shutter 20A is detected to pass may be between the central position of the opening 11 and the position of the blade 21a with the leading shutter 20A positioned in the closed position. This is because the trailing shutter 20B starts moving as soon as possible after the leading shutter 20A starts moving. Also, the blade 21a is a first blade, the movable range of which is the largest among those of the blades 21a to 23a.

Figure 9:
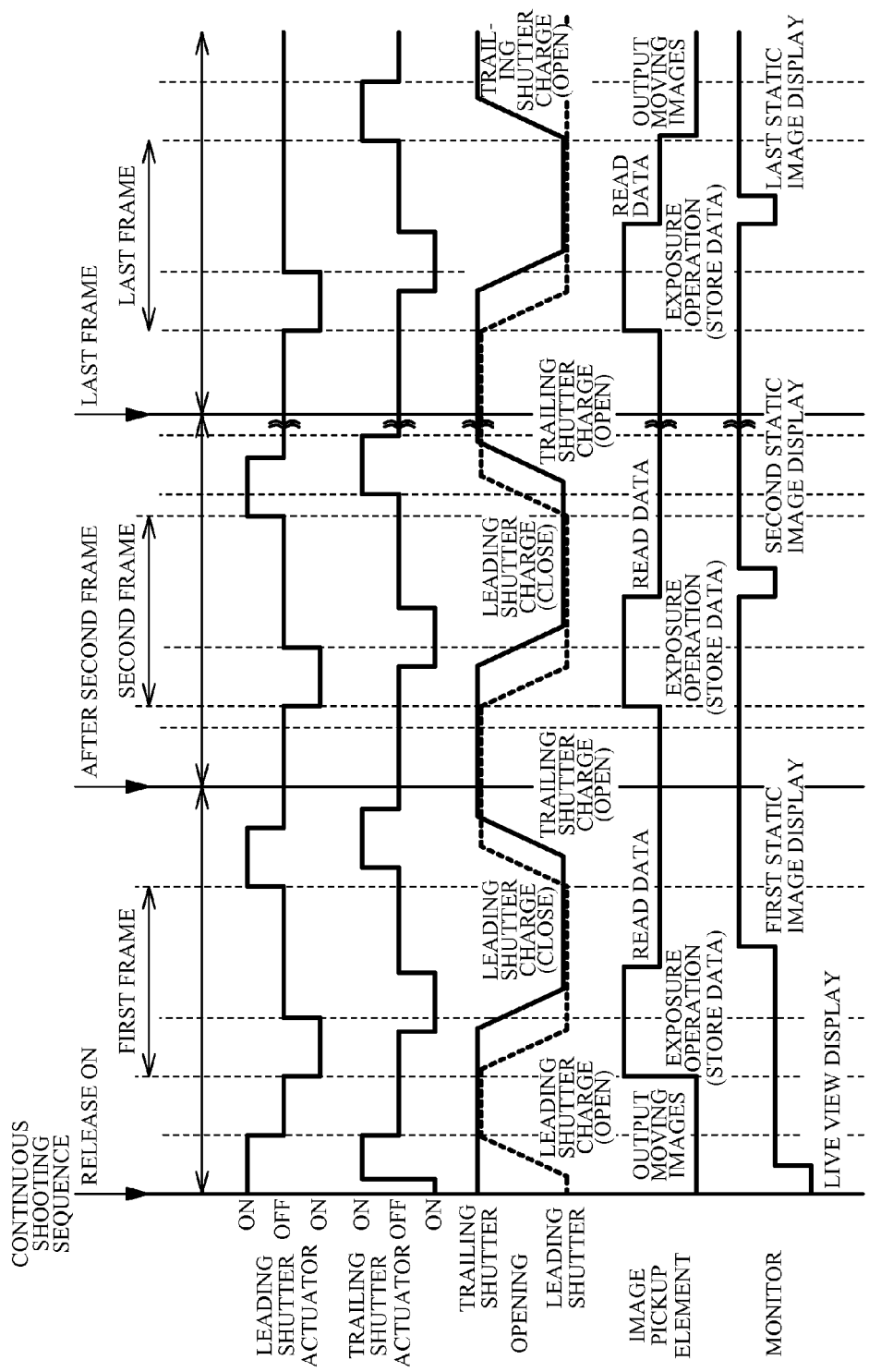
FIG. 9 is a timing chart of the focal plane shutter in a continuous shooting mode.

Next, a description will be given of the continuous shooting mode of the focal plane shutter 1. FIG. 9 is a timing chart of the focal plane shutter 1 in the continuous shooting mode. When the release switch is pushed, the charging operation is performed as mentioned above, and then the leading shutter 20A closes the opening 11 and the trailing shutter 20B recedes from the opening 11 as illustrated in FIG. 5. After a predetermined pause period elapses from the time when the charging operation finishes, the exposure operation for one frame starts. The exposure operation for one frame is a first exposure operation. The control portion 110 starts energizing the coil of the actuator 70a and detects that the blade 21a of the leading shutter 20A passes through the point Da, and then starts moving the trailing shutter 20B. Thus, the trailing shutter 20B closes the opening 11 as illustrated in FIG. 8. Even in this case, after a predetermined period elapses from the time when the leading shutter 20A passes through a predetermined position, the trailing shutter 20B starts moving.

The leading shutter 20A stops at the opened position receding from the opening 11 and the trailing shutter 20B stops at the closed position, which finishes the exposure operation for one frame. After the exposure operation for one frame finishes, a second charging operation starts. The control portion 110 energizes the actuator 70a to move the leading shutter 20A toward the closed position with the trailing shutter 20B closing the opening 11. After detecting that the blade 21a of the leading shutter 20A passes through the point Da, the control portion 110 energizes the actuator 70b to move the trailing shutter 20B toward the opened position. Thus, in the second charging operation, the leading shutter 20A moves to the closed positon and the trailing shutter 20B moves to the opened position while the leading shutter 20A and the trailing shutter 20B cooperatively maintain the opening 11 in the closed state. Further, a first static image taken by the first exposure operation is displayed on the monitor 200 for a predetermined period.

Subsequently, the exposure operation for a second frame starts, after a predetermined pause period elapses. The exposure operation for the second frame is a second exposure operation. Also, in the exposure operation for the second frame, the leading shutter 20A moves from the closed position to the opened position, and the trailing shutter 20B moves from the opened position to the closed position. A second static image taken by the second exposure operation is displayed on the monitor 200 for a predetermined period. In the charging operation after the second exposure operation finishes, the leading shutter 20A moves to the closed position and the trailing shutter 20B moves to the opened position while the opening 11 is maintained in the closed state. After the second frame, before a frame just before the last frame shot at the end of the continuous shooting, the exposure operation for the second frame is repeated.

In the last frame, after the exposure operation is performed, only the trailing shutter 20B moves to the opened position, so the opening 11 is fully opened. In this way, the continuous shooting finishes. Additionally, after the last static image taken by the last exposure operation is displayed on the monitor 200 for a predetermined period, the monitor 200 is brought into the live view display.

In this way, the control portion 110 causes the monitor 200 to continuously display static images taken by continuous exposure operations. Thus, a photographer can shoot while checking images shot in the continuous shooting. Additionally, the first static image has only to be displayed on the monitor 200, at least after the first exposure operation and before the second exposure operation. Further, during the second exposure operation, the first static image may be displayed on the monitor 200.

Also, in the charging operation in the continuous shooting, after it is detected that the preceding leading shutter 20A passes through the point Da, the trailing shutter 20B moves away from the opening 11. However, the point through which the leading shutter 20A is detected to pass is not limited to the point Da. For example, when it is detected that the leading shutter 20A passes through the point Db, the trailing shutter 20B may start moving away from the opening 11. Further, after a predetermined period elapses from the time when the leading shutter 20A starts moving to the closed position, the trailing shutter 20B may start moving to the opened position.

As mentioned above, in the charging operation performed between the exposure operation for the first frame and the exposure operation for the second frame, the leading shutter 20A moves from the opened position to the closed positon and the trailing shutter 20B moves from the closed position to the opened position, while the opening 11 is maintained in the closed state. This can reduce the imaging interval. This will be described later in detail.

Figure 10:
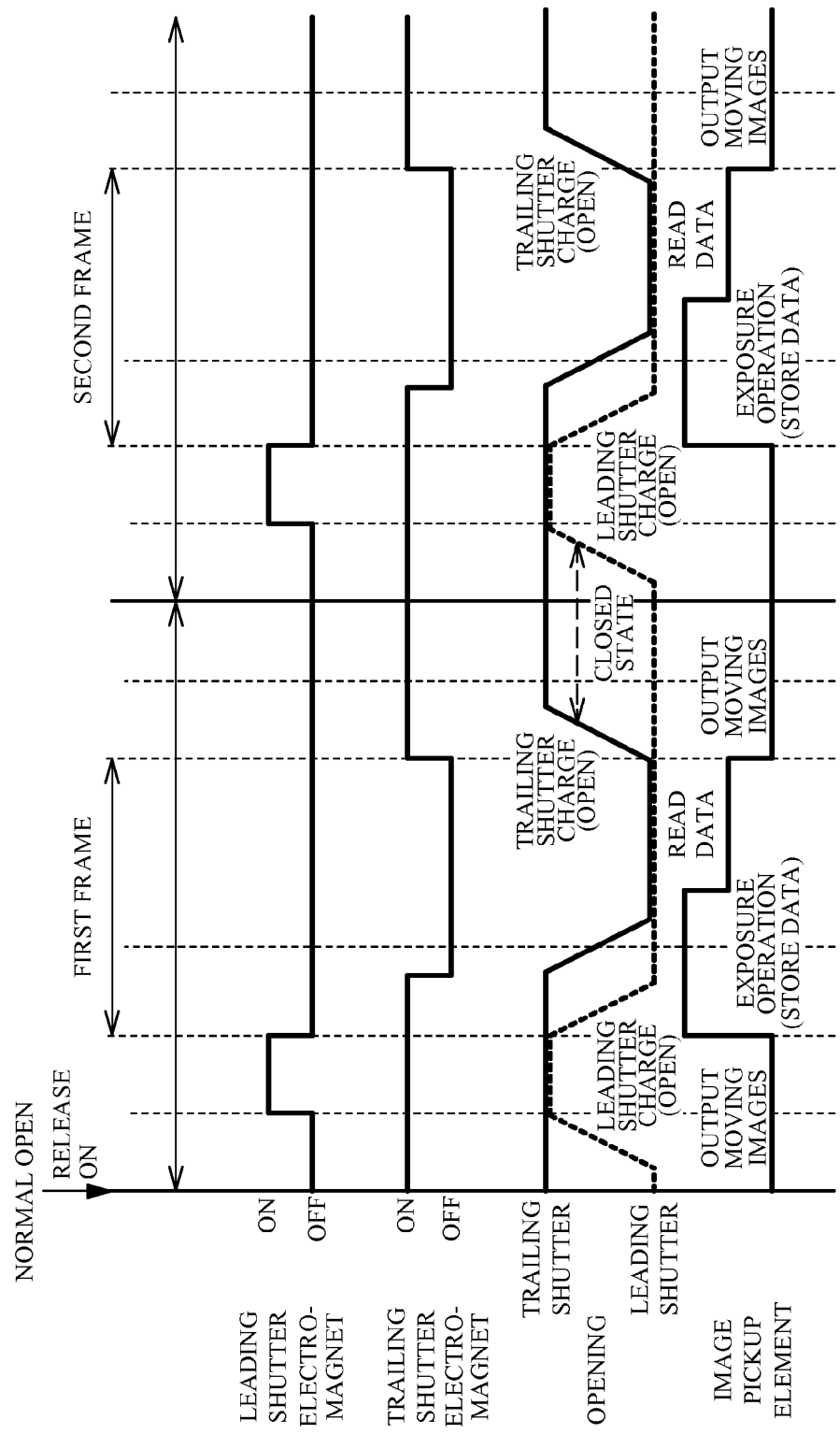
FIG. 10 is a timing chart of a conventional normally open type of a focal plane shutter using a set member in a continuous shooting.

FIG. 10 is a timing chart of a normally open type of a focal plane shutter in which a leading shutter and a trailing shutter are set by a conventional set member. The conventional normally open type of the focal plane shutter includes: a leading shutter electromagnet adsorbing and holding a leading shutter drive lever so as to position the leading shutter at the closed position; a trailing shutter electromagnet adsorbing and holding a trailing shutter drive lever so as to position the trailing shutter at the opened position; and a leading shutter biasing member and a trailing shutter biasing member biasing the leading shutter drive lever and the trailing shutter drive lever away from the leading shutter electromagnet and the trailing shutter electromagnet, respectively. In the state where the leading shutter drive lever and the trailing shutter drive lever are respectively adsorbed to and held by the leading shutter electromagnet and the trailing shutter electromagnet, the energization is switched so as to reduce the adsorption forces of the leading shutter electromagnet and the trailing shutter electromagnet. Thus, the leading shutter drive lever and the trailing shutter drive lever respectively move away from the leading shutter electromagnet and the trailing shutter electromagnet, allowing the leading shutter and the trailing shutter to move. In this way, the exposure operation is performed.

In such a focal plane shutter, the charging operation is performed as follows. When the set member rotates in one direction, the trailing shutter drive lever is moved against the biasing force of the trailing shutter biasing member and then is adsorbed to and held by the trailing shutter electromagnet. This positions the trailing shutter at the opened position, which fully opens the opening. While the opening is fully opened, the set member further continues rotating the same direction, whereby the leading shutter drive lever is moved against the biasing force of the leading shutter biasing member and then is adsorbed to and held by the leading shutter electromagnet. This positions the leading shutter at the closed position. In the charging operation, the opening is fully opened once in such a way.

The reason why the opening is fully opened once in the charging operation is as follows. In the conventional normally open type of the focal plane shutter, before the shooting starts and after the shooting finishes, the fully opened state has to be maintained such that the trailing shutter drive lever is adsorbed to and held by the trailing shutter electromagnet and that the trailing shutter is positioned at the opened positon. For this reason, the set member has to rotate to move the trailing shutter to the opened position and then to move the leading shutter to the closed position. The set member is designed in this way, so the set member cannot respectively position the leading shutter and the trailing shutter at the closed position and the opened position while the closed state is maintained. It is therefore impossible to move both the leading shutter and the trailing shutter and to finish the charging operation right away.

Therefore, the exposure operation for the second frame cannot be performed immediately. This might increase the imaging interval.

Further, before the opening is fully opened by the charging operation, a control portion has to read image data of a first frame from an image pickup element. This is because a smear or the like might occur to influence the image quality, in a case where the image data are read from the image pickup element with the opening opened. Thus, the opening cannot be opened, until the exposure operation for the first frame finishes and the image data are read from the image pickup element. Therefore, the charging operation has to start after the image data are read from the image pickup element. In the above mentioned, the conventional normally open type of the focal plane shutter might increase the imaging interval in the continuous shooting.

The focal plane shutter according to the present embodiment can perform the charging operation immediately without fully opening the opening 11 temporarily, as described above. It is thus possible to perform the charging operation immediately without fully opening the opening 11, after the exposure operation for the first frame finishes. It is also possible to perform the exposure operation for the second frame immediately. This can reduce the imaging interval in the continuous shooting in this way. Accordingly, the continuous shooting can be performed at a high frame rate.

Further, since the opening 11 is maintained fully closed during the charging operation in the present embodiment, the image can be read during the charging operation. For this reason, the charging operation and reading of the image can be performed in the same time, so the imaging interval can be further reduced.

As described above, in the continuous shooting in the camera A including the focal plane shutter 1, after the exposure operation finishes, the control portion 110 energizes the coil of the actuator 70a to move the leading shutter 20A toward the closed position in the state where the trailing shutter 20B closes the opening 11. Further, in the single shooting mode, after the exposure operation finishes, the control portion 110 energizes the coil of the actuator 70b to move the trailing shutter 20B away from the opening 11, so the opening 11 is brought into the fully opened state. That is, the camera A has such two different imaging sequences. Also, the focal plane shutter 1 can be adapted to those sequences. It is thus possible to provide the camera that can be used in a case of high-speed shooting in the continuous shooting mode in checking static images on the monitor or a case of shooting moving images in checking the moving images, as needed. That is, it is possible to provide the camera that can reduce the imaging interval in the continuous shooting.

Next, a description will be given of a method for switching the single shooting mode and the continuous shooting mode. For example, pushing of the release switch for a short time may switch to the single shooting mode, and pushing of the release switch for a long time may switch to the continuous shooting mode. Also, when the pushing of the release switch for a short time is repeated for a predetermined period, the continuous shooting mode may be switched from the single shooting mode. It may be determined whether or not the release switch is repeatedly pushed for a predetermined period, on the basis of counting the number of times the leading shutter 20A or the trailing shutter 20B passes through a predetermined position in accordance with the leading shutter sensor 60a or the trailing shutter sensor 60b. Otherwise, a switch for switching between the single shooting mode and the continuous shooting mode may be provided, and the shooting may be continuously performed while the release switch is pushed and after the continuous shooting mode is switched.

In the camera A according to the present embodiment, it is conceivable to use known technologies for detecting a distance to an object or the amount of light exposure in shooting on the basis of image information obtained from the image pickup element 130. After the second frame in the continuous shooting mode mentioned above, the object image cannot be obtained from the image pickup element 130 just before the exposure operation. Therefore, for this case of such a configuration, in the shooting after the second frame, the shooting may be performed by using the distance information and the amount of light exposure relevant to the proximate first frame.

While the exemplary embodiments of the present invention have been illustrated in detail, the present invention is not limited to the above-mentioned embodiments, and other embodiments, variations and modifications may be made without departing from the scope of the present invention.

The control portion 110 and the drive control portion 170 may be achieved by a single IC chip.

In the above embodiment, the leading shutter and the trailing shutter are each composed of three blades, but they are not limited to this.

Finally, several aspects of the present invention are summarized as follows.

According to an aspect of the present invention, there is provided an imaging device including: an image pickup element; a focal plane shutter including: a board including an opening exposing the image pickup element; a leading shutter and a trailing shutter movable between a closed position to close the opening and an opened position to open the opening; and a leading shutter actuator and a trailing shutter actuator respectively driving the leading shutter and the trailing shutter, a drive control portion that drives the leading shutter actuator and the trailing shutter actuator; and a control portion that controls the image pickup element, wherein the leading shutter and the trailing shutter are positioned in the opened position, both when shooting starts and when the shooting finishes, the leading shutter moves from the closed position to the opened position and the trailing shutter moves from the opened position to the closed position to perform an exposure operation, during continuous shooting, after a first exposure operation finishes, a charging operation is performed such that the leading shutter moves from the opened position to the closed position and the trailing shutter moves from the closed position to the opened position while the opening is maintained in a closed state by cooperation of the leading shutter and the trailing shutter, after the charging operation finishes, a second exposure operation is performed.

According to another aspect of the present invention, there is provided an imaging device including: an image pickup element; a focal plane shutter including: a board including an opening exposing the image pickup element; a leading shutter and a trailing shutter movable between a closed position to close the opening and an opened position to open the opening; and a leading shutter actuator and a trailing shutter actuator respectively driving the leading shutter and the trailing shutter, a drive control portion that drives the leading shutter actuator and a trailing shutter actuator; and a control portion that controls the image pickup element, wherein the leading shutter moves from the closed position to the opened position and the trailing shutter moves from the opened position to the closed position to perform an exposure operation, a first sequence is capable of being performed such that the trailing shutter moves away from the opening to the opened position after the exposure operation finishes, a second sequence is capable of being performed such that the leading shutter moves to the closed position in a state where the trailing shutter closes the opening after the exposure operation finishes, and then that the trailing shutter moves to the opened position.

According to another aspect of the present invention, there is provided a focal plane shutter including: a board including an opening; a leading shutter and a trailing shutter movable between a closed position to close the opening and an opened position to open the opening; and a leading shutter actuator and a trailing shutter actuator respectively driving the leading shutter and the trailing shutter, wherein the leading shutter and the trailing shutter are positioned in the opened position, both when shooting starts and when the shooting finishes, the leading shutter moves from the closed position to the opened position and the trailing shutter moves from the opened position to the closed position to perform an exposure operation, during continuous shooting, after a first exposure operation finishes, a charging operation is performed such that the leading shutter moves from the opened position to the closed position and the trailing shutter moves from the closed position to the opened position while the opening is maintained in a closed state by cooperation of the leading shutter and the trailing shutter, after the charging operation finishes, a second exposure operation is performed.

What is claimed is:

1. An imaging device, comprising:
an image pickup element;
a focal plane shutter including:
  a board including an opening exposing the image pickup element;
  a leading shutter and a trailing shutter movable between a closed position to close the opening and an opened position to open the opening; and
  a leading shutter actuator and a trailing shutter actuator respectively driving the leading shutter and the trailing shutter,
a drive control portion that drives the leading shutter actuator and the trailing shutter actuator; and
a control portion that controls the image pickup element, wherein:
the leading shutter and the trailing shutter are positioned in the opened position, both when shooting starts and when the shooting finishes,
the leading shutter moves from the closed position to the opened position and the trailing shutter moves from the opened position to the closed position to perform an exposure operation,
during continuous shooting, after a first exposure operation finishes, a charging operation is performed such that the leading shutter moves from the opened position to the closed position and the trailing shutter moves from the closed position to the opened position while the opening is maintained in a closed state by cooperation of the leading shutter and the trailing shutter,
after the charging operation finishes, a second exposure operation is performed,
the focal plane shutter includes a detection portion detecting that the leading shutter passes through a predetermined position, and
in the charging operation, the leading shutter starts moving from the opened position to the closed position, the leading shutter is detected by the detection portion, and then, the trailing shutter starts moving from the closed position to the opened position.

2. The imaging device of claim 1, wherein the control portion reads image data from the image pickup element at least during the charging operation.

3. The imaging device of claim 1, wherein
the focal plane shutter includes the detection portion detecting that the leading shutter passes through a predetermined position,
in the charging operation, after the leading shutter passes through the predetermined position, the trailing shutter starts moving from the closed position to the opened position.

4. The imaging device of claim 1, wherein
the control portion displays an image taken by the first exposure operation on a display portion, at least during a period from when the first exposure operation finishes to when the second exposure operation finishes.

5. An imaging device, comprising:
an image pickup element;
a focal plane shutter including:
  a board including an opening exposing the image pickup element;
  a leading shutter and a trailing shutter movable between a closed position to close the opening and an opened position to open the opening; and
  a leading shutter actuator and a trailing shutter actuator respectively driving the leading shutter and the trailing shutter,
a drive control portion that drives the leading shutter actuator and the trailing shutter actuator; and
a control portion that controls the image pickup element, wherein:
the leading shutter moves from the closed position to the opened position and the trailing shutter moves from the opened position to the closed position to perform an exposure operation,
a first sequence is capable of being selectively performed such that the trailing shutter moves away from the opening to the opened position when the leading shutter recedes from the opening, after the exposure operation finishes,
a second sequence is capable of being selectively performed such that the leading shutter moves to the closed position in a state where the trailing shutter closes the opening after the exposure operation finishes, and then that the trailing shutter moves to the opened position,
the first sequence and the second sequence are capable of being selected, and
the drive control portion that drives the leading shutter actuator and the trailing shutter actuator based on the selected sequence.

6. A focal plane shutter, comprising:
a board including an opening;
a leading shutter and a trailing shutter movable between a closed position to close the opening and an opened position to open the opening; and
a leading shutter actuator and a trailing shutter actuator respectively driving the leading shutter and the trailing shutter,
wherein:
the leading shutter and the trailing shutter are positioned in the opened position, both when shooting starts and when the shooting finishes, the leading shutter moves from the closed position to the opened position and the trailing shutter moves from the opened position to the closed position to perform an exposure operation, during continuous shooting, after a first exposure operation finishes, a charging operation is performed such that the leading shutter moves from the opened position to the closed position and the trailing shutter moves from the closed position to the opened position while the opening is maintained in a closed state by cooperation of the leading shutter and the trailing shutter, after the charging operation finishes, a second exposure operation is performed, the focal plane shutter includes a detection portion detecting that the leading shutter passes through a predetermined position, and in the charging operation, the leading shutter starts moving from the opened position to the closed position, the leading shutter is detected by the detection portion, and then, the trailing shutter starts moving from the closed position to the opened position.

\* \* \* \* \*